United States Patent (12) United States Patent
Fry (10) Patent No.: US 9,196,250 B2
(45) Date of Patent: Nov. 24, 2015

(54) APPLICATION SERVICES INTERFACE TO ASR

(71) Applicant: QNX Software Systems Limited, Kanata (CA)

(72) Inventor: Darrin Kenneth John Fry, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 315 days.

(21) Appl. No.: 13/679,654

(22) Filed: Nov. 16, 2012

(65) Prior Publication Data
US 2014/0142945 A1 May 22, 2014

(51) Int. Cl.
*G10L 15/04* (2013.01)
*G10L 15/26* (2006.01)
*G10L 15/32* (2013.01)

(52) U.S. Cl.
CPC *G10L 15/26* (2013.01); *G10L 15/32* (2013.01)

(58) Field of Classification Search
CPC ......... G10L 15/32; G10L 15/30; G10L 15/22; G10L 15/19; G10L 15/00; G10L 15/265; G10L 15/193; G10L 17/16
USPC .............. 704/231, 235, 251, 270, 275, 270.1, 704/255, 257, 238–240, 246, 247, 250–252, 704/254
See application file for complete search history.

(56) References Cited

U.S. PATENT DOCUMENTS

| | | | |
|---|---|---|---|
| 6,456,974 B1 | 9/2002 | Baker et al. | |
| 6,526,380 B1 * | 2/2003 | Thelen et al. | 704/251 |
| 6,785,654 B2 | 8/2004 | Cyr et al. | |
| 2002/0128832 A1 * | 9/2002 | Smith | 704/231 |
| 2002/0133354 A1 | 9/2002 | Ross et al. | |
| 2003/0171929 A1 | 9/2003 | Falcon et al. | |
| 2005/0165609 A1 * | 7/2005 | Zuberec et al. | 704/270 |
| 2005/0240404 A1 | 10/2005 | Gurram et al. | |
| 2007/0055525 A1 | 3/2007 | Kennewick et al. | |
| 2008/0133237 A1 * | 6/2008 | Ishikawa et al. | 704/251 |
| 2008/0208587 A1 | 8/2008 | Ben-David et al. | |
| 2009/0299745 A1 | 12/2009 | Kennewick et al. | |
| 2010/0324910 A1 | 12/2010 | Chambers et al. | |
| 2011/0029311 A1 | 2/2011 | Minamino et al. | |
| 2011/0224981 A1 | 9/2011 | Miglietta et al. | |
| 2014/0067403 A1 * | 3/2014 | Burke et al. | 704/275 |

FOREIGN PATENT DOCUMENTS

| | | |
|---|---|---|
| EP | 1 912 205 | 4/2008 |
| WO | WO 2009/145796 | 12/2009 |

OTHER PUBLICATIONS

Extended European Search Report in EP application 13173119.2-1910, dated Aug. 12, 2013, pp. 1-5.
Extended European Search Report in EP application 13173059.0-1910, dated Aug. 12, 2013, pp. 1-6.
European Search Report, European Application No. 12193113.3-1910, Apr. 4, 2013, 8 pgs.

* cited by examiner

*Primary Examiner* — Huyen Vo
(74) *Attorney, Agent, or Firm* — Brinks Gilson & Lione (57) ABSTRACT

An application services interface system includes an automatic speech recognition control application program interface that receives a request for a recognition session from an application-based automatic speech recognition controller. An automatic speech recognition control engine directs the performance of an automatic speech recognition module. The automatic speech recognition module compares a spoken utterance to a vocabulary of active grammars to generate recognition results through limited data interchanges or exchanges.

26 Claims, 7 Drawing Sheets

```
A sample recognition asset for an intent request:
[email.cfg]
# elements with a ":field" modifier are used to identify which field to fill,
the
text is not included in the field's data.
# <...> matches anything up to the next recognized element of the rule being
evaluated, the matched data is discarded
# <*> matches anything up to the next recognized element of the rule being
evaluated, the match data is added to the field's data.
# if field-id=0 is not satisfied by the utterance then that intent is not
matched.
intents{
email {
intent-id = 1
root-field = action
field {
action {
field-id = 0
request-ordinal = 0
extract-ordinal = 1
extract <get-action>
}
recipient {
field-id = 1
request-ordinal = 1
extract-ordinal = 4
optional = false
repeat = 1:*
extract = <recipient>
prompt = tts://Who would you like to send this email
to?
}
message {
field-id = 3
request-ordinal = 3
extract-ordinal = 2
type = dictation
optional = false
prompt = tts://What would you like your message to
say
extract = <>
}
subject {
field-id = 2
request-ordinal = 2
extract-ordinal = 3
type = dictation
optional=false
prompt = tts://What is the email's subject?
extract = <get-subject>
}
}
get-action {
rule = <command-pre:action=skip,repeat=*> <command:field>
<command-post:action=skip,repeat=*>
command-pre {
```

Figure 4

```
I
you
could
would
need
quick
short
to
please
a
an
}
command-post {
a
an
message
}
command {
[send|create|compose] <command-pre:repeat=*>
(email|note|message)
}
}
get-message{
rule = (message|body) <*>
query = tts://what do you want your message to say
}
get-subject {
rule = <word:field> <*>
word {
subject
regarding
about
}
query = tts://what's the email's subject
}
get-recipient {
rule = <...> ([to|for]:field) <*> ([and <*>]:repeat 0,*)
query = tts://To whom would you like to send this email
}
}
set-alarm {
intent-id = 2
etc ...
}
```

Figure 5

```
The utterances would be processed and results given as follows:
Ex. 1. request is "intent" and
processing is "full"
<call to start speech session>
Utterance: "Could you please send an email to
phillip darcy regarding my upcoming party"
<intent>email</intent>
<extracted field = subject>my
upcoming party</extracted>
<extracted field = to>phillip darcy</extracted>
--prompt--> What would
you like your message to say?
Utterance: "We'll have to postpone till next Saturday"
//collected
utterance used to fill the "message" field.
<extracted field = message>We'll have to postpone
till next Saturday</field>
<result sent to caller>
Result to conversation modules:
result:
confidence = <confidence over all results>
utterances // provides the original
transcription of the utterance
// each utterance is stored as a series of
terminals, each with confidence
initial = Could you please send an email to
phillip darcy regardign my upcoming party
message = We'll have to
postpone till next Saturday
intent
id:1, action:email
fields
field:to, id:1, value:phillip darcy
field:subject, id:2, value:my upcoming party
field:message, id:3,
value:We'll have to postpone till next Saturday
```

Figure 6

```
Ex. 2. request is "intent" and processing is "turn"
<call to start speech session>
Utterance:
"Could you please send an email to phillip darcy regarding my upcoming party"
<intent>email</intent>
<extracted field = subject>my upcoming party</extracted>
<extracted field =
to>phillip darcy</extracted>
<result sent to caller>
result:
confidence = <confidence
over all results>
utterances // provides the original transcription of the
utterance
// each utterance is stored as a series of terminals, each
with
confidence
initial = Could you please send an email to phillip darcy
regardign my upcoming party
intent
id:1, action:email
fields
field:to, id:1, value:phillip darcy
field:subject, id:2, value:my upcoming party
missing_fields
field:message
At this point the app can request a recognition turn to fill the missing
field(s)
using intent or dictation requests
query = tts://To whom would you like to send
this email
}
}
set-alarm {
intent-id = 2
etc ...
}
have to postpone till next Saturday
```

Figure 7

APPLICATION SERVICES INTERFACE TO ASR

BACKGROUND OF THE INVENTION

1. Technical Field

This disclosure relates to voice recognition and more particularly to a speech recognition architecture that enables speech platforms to recognize speech.

2. Related Art

Automatic Speech Recognition (ASR) allows devices to listen to spoken language to determine what has been said. It determines what words, phrases, or sentences are spoken by comparing portions of speech to a group of words to produce a recognition result.

Because applications on mobile devices are not always native to speech engines, the applications may not include speech recognition or may not allow users to complete tasks directly through speech recognition commands. When an application is not integrated into an ASR, users may have to undertake a number of steps to interface an application to an ASR. Some applications require users to manually select software that will capture a speaker's input, the channels that will deliver the input, the speech engine that will recognize the input, etc. These steps may substantially undermine the application's value in a busy hands free environment.

When software or applications include speech recognition capability, the application's ability to determine what has been said may be limited. Such systems may recognize limited vocabularies and may only recognize speech spoken by certain users because of its limited resources. The systems may not respond to many speech patterns, accents, the many ways a request can be made, or the language it receives.

BRIEF DESCRIPTION OF THE DRAWINGS

The inventions can be better understood with reference to the following drawings and description. The components in the figures are not necessarily to scale, emphasis instead being placed upon illustrating the principles of the inventions. Moreover, in the figures, like referenced numerals designate corresponding parts throughout the different views.

DETAILED DESCRIPTION OF THE PREFERRED EMBODIMENTS

An ASR architecture allows applications to interface speech recognition services locally or through a local or distributed network. Some speech application program interfaces are platform agnostic meaning the applications may execute mono-modal or multimodal tasks (e.g., execute transactions, access applications such as maps, weather reports, phones, etc., or capture information through dictation or filling in forms) whenever the application accesses a publicly accessible network. The ASR architecture may recognize speech in real-time with few or no callbacks or limited data interchanges between an application and an ASR service. A real-time process may match a human's perception of time or a virtual process that is processed at the same rate (or perceived to be at the same rate) as a physical or an external process. A callback may comprise a scheme where a connection or a recognition session is broken and a subsequent connection or recognition session is automatically or manually reestablished to facilitate additional data interchanges between an application and an ASR service.

The ASR architecture supports synchronous recognition and may deliver grammar-based ASR recognition results, natural language-based ASR recognition results, or a combination through a single recognition session (or ASR session). The recognition results may comprise indicia, symbols, objects, or agnostic data that may control or support internal or external applications, devices, and/or processes across diverse operating system platforms. ASR agnostic input and/or control may also provide the benefit of spoken language recognition, spoken language control, and Intent selections in any language, without requiring one or more ASR modules to recognize a spoken language or dialect. In some systems ASR vocabularies and ASR Intents are selected or identified by the geographic location or locale. The recognition results may be returned from one, two, or more ASR services (or a plurality of ASR modules or a plurality of speech engines) in the time the ASR service receives speech and delivers a recognition result or after a batch delay or a program delay. The ASR architecture is accurate, secure, robust, and scalable.

Some ASR architectures include a speech application program interface that includes or interfaces an ASR controller that provides a mechanism for a remote or local application to request a recognition session that is stateful, in which the ASR controller remote from the ASR service or the ASR module temporarily or permanently monitors the details of the state of the recognition or ASK session (e.g., it is the domain expert) and saves information about the recognition or ASR session when a an Intent is requested in a Turn Process. In some ASR architectures, the ASR controllers collect and maintain state when requesting an Intent in a Turn Process while the ASR services (e.g., the ASR control engine(s), ASR API(s), ASR module(s), etc.) are stateless. A stateless handling of a spoken audio or its representation by an ASR service may process the content of a recognition request in a single session (e.g., time in which the ASR controller and ASR control engine maintain a connection), without monitoring the details of prior requests from an originating application. In ASR architectures an Intent may comprise a recognition of a speaker's purpose that is conveyed through a spoken sequence and a Turn Process may comprise a recognition of a single utterance through one comparison to a vocabulary that may render one or multiple results. A Full Process may comprise multiple Turn Processes that returns multiple results.

After an input is matched against active grammars (e.g., from a natural language-based vocabulary and/or a grammar-based vocabulary), the recognition results are transmitted to the originating application or designated application(s) that may be capable of, but is not required to, perform subsequent processing. In some ASR architectures, the time during which an ASR service accepts input and processes information (during the recognition or ASR sessions) are subject to programmable restrictions. The ASR sessions may be subject to a predetermined time limit or constraint, for example. When a violation occurs, the ASR session may be terminated or temporarily suspended or deferred by the ASR service. Some or all of the terminated, suspended, or deferred ASR sessions may be restored automatically when violation(s) are resolved or event(s) occur. Some ASR sessions may be based on a semi-persistent connection that allows an interactive data or information interchange between a speech application program interface (that may include or interface the ASR controller) and an ASR service or one or more of the components that comprise the ASR service. In other words, the connection could stay open in response to the speech application program interface request and/or ASR service request beyond a single or predetermined number of exchanges. Such a connection may reduce a user's perceived latency because a subsequent exchange or interchange will not have to pay the penalty of the delay of the teardown of the prior connection or the rebuilding of a subsequent connection. Moreover, errors may be reported in the same connection without having to reestablish a connection.

Some implementations of the ASR architecture separate or decompose the controls that manage the speech application into components or separate functional elements. The logic responsible for collecting the spoken audio (or utterance), passing the spoken audio to the ASR service, and matching the collected spoken audio to active grammars may be distributed between the application and the ASR service. In one architecture the controller that manages the application with which the user interacts, collects the spoken audio, and transmits the spoken audio or its representation to the ASR service, is embedded within or interfaces the speech application program interface or an ASR controller that resides in or interfaces the application. The speech application program interface and/or the application ASR controller may be remote from and run on a separate computing platform than the ASR service. In others implementations the speech application program interface and/or the application ASR controller may be local to the ASR service and access the ASR service directly rather than through a communication channel. Other control logic is embedded in the ASR service to manage the comparison of the spoken audio to a vocabulary and return recognition results back to the application or a designate (e.g., another application, one or more destinations or addresses, etc.). The architecture enables applications including those that are run on wireless devices, mobile devices, handheld devices, pagers, vehicles, medical devices or systems, etc. to include speech recognition while moving the computationally intensive speech platform, and speech engine, to a local ASR service or a remote ASR service that may be run on a server, a computer cluster (e.g., a group of independent network computer servers that operate and appear to clients as if they were a single unit) or a cloud based computing platform. A cloud or cloud based computing platform may refer to a scalable platform that provides a combination of services including computing, durable storage of both structured and unstructured data, network connectivity and other services. Metered services provided by a cloud or cloud based computing platform may be interacted with (provisioned, de-provisioned, or otherwise controlled) via one or more of the ASR control APIs. A server may refer to one or more computers and/or programs that respond to commands received from a client device or application. In some systems and processes it is a machine's or application's role that establishes it as a server.

Figure 1:
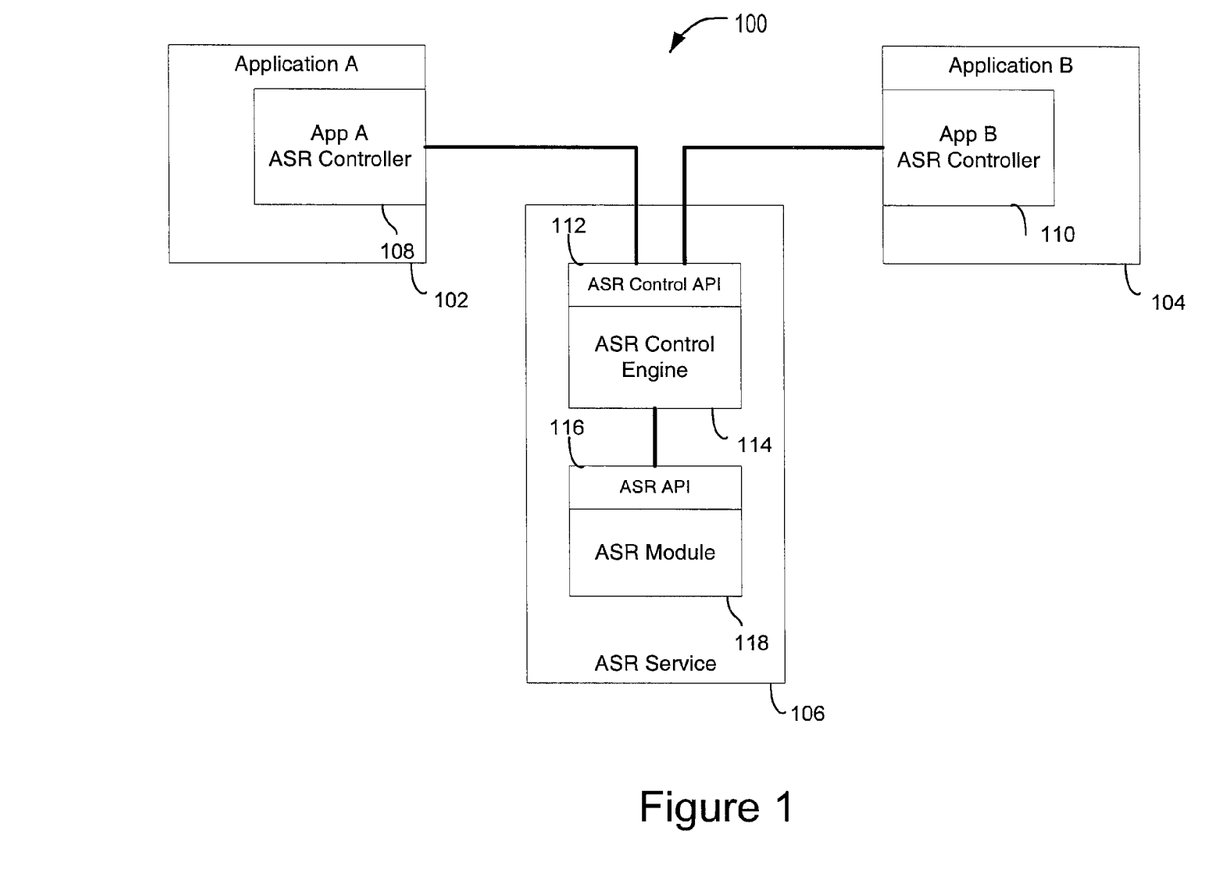
FIG. 1 is a block diagram of an ASR architecture.

FIG. 1 is a block diagram of an implementation of the ASR architecture 100. It shows a front-end (application A 102 and application B 104) and a back-end (ASR service 106). The front-end may include applications accessed or downloaded from a remote central repository such as an application store accessible through a publicly accessible distributed network like the Internet that may include a cellular network, for example. An application store may include a digital distribution platform that provides mobile software to mobile, hands-free, or end-user devices. The applications may include a speech application program interface and an ASR controller (108 and 110 in FIG. 1).

The speech application program interface is the application with which the user interacts. It may solicit or transmit a request for a separate or different speech application to collect and process the spoken audio streams (e.g., spoken utterances) and pass those audio to the ASR service 106 through an ASR controller 108 or 110. In other implementations, like the front-end ASR controller A 108 and the front-end ASR controller B 110, the speech application program interfaces are extensible meaning they may have different features to serve their respective applications. Some speech application program interfaces may process spoken audio streams; isolate segments that are probably speech, and convert the isolated segments into a form that can be transmitted to the ASR service 106 themselves. Other speech application program interfaces may have more or fewer features. Some alternative speech application program interfaces solicit a separate speech application that collects spoken audio streams and pass only the collected spoken audio streams or their representations with other information such as Intents to the ASR service 106 on its behalf. In FIG. 1, the front-end ASR controllers 108 and 110 transmit or request the transmission of the collected speech audio streams or characteristics of them to the ASR service 106 with other information such as one or more resource identifiers that may, for example, identify the type of application that requested ASR recognition or is associated with the front-end ASR controllers 108 or 110, meta data that describes the spoken audio streams, external resources that identifies the processing to be applied (e.g., a natural language-based recognition, a grammar-based recognition, a combination-based recognition, a multipass process recognition, etc.), identify the processing to be used (e.g., Full or Turn) information that describe the types of results that the application is expecting, the Intents to be used, etc., and or some combination of this exemplary list.

In operation, a front-end ASR controller 108 and/or 110 may request a recognition session by including information indicating the type of application that was executed (e.g., a dictation), specifics as to what was captured (e.g., speech recorded in a conference room), meta data (e.g., about the size of the file, characteristics captured, language type, etc.), an identifier that provides the Intents and/or grammars or addresses such as a URL of the Intents and/or grammars to be applied (if Intent-based and/or grammar-based), and the kind, type, and/or form of the recognition results the application is looking for (e.g., a textual token of limited length in an XML format). In this example, a token is part of a grammar or a string that defines words or other entities that may be spoken.

When such information is received by the ASR control API 112, the ASR control engine 114 directs the performance and procedures to be followed by the ASR module 118 (also referred to as the speech engine). The ASR module 118 matches the segments that are probably speech or characteristics representing those segments against a vocabulary to produce a recognition result that is delivered (or transmitted) to the ASR control engine 114 through the ASR API 116. Depending on the requested recognition results, the ASR module 118 may perform subsequent processing of the recognition result to match the requested domains. For example, when the ASR module 118 is a natural language-based speech engine but the application requests domain specific results, the natural language recognition result published by the ASR module 118 may be processed again by the ASR module 118 against a much smaller vocabulary domain to generate a multi-processed recognition result that is substantially similar or identical to a grammar-based recognition. Alternatively, when the ASR module 118 is a grammar-based speech engine, the ASR module 118 matches the likely speech segments or characteristics representing them against the active grammars received from the application or active grammars found at the URLs or addresses provided by the application to produce a grammar-based result.

In some situations, the ASR control engine 114 subsequently processes the recognition results to comply with the originating application's requests or for other reasons. The further processed recognition results are then published or transmitted through the ASR control API 112 to the originating application, multiple applications, or one or more addresses.

Figure 2:
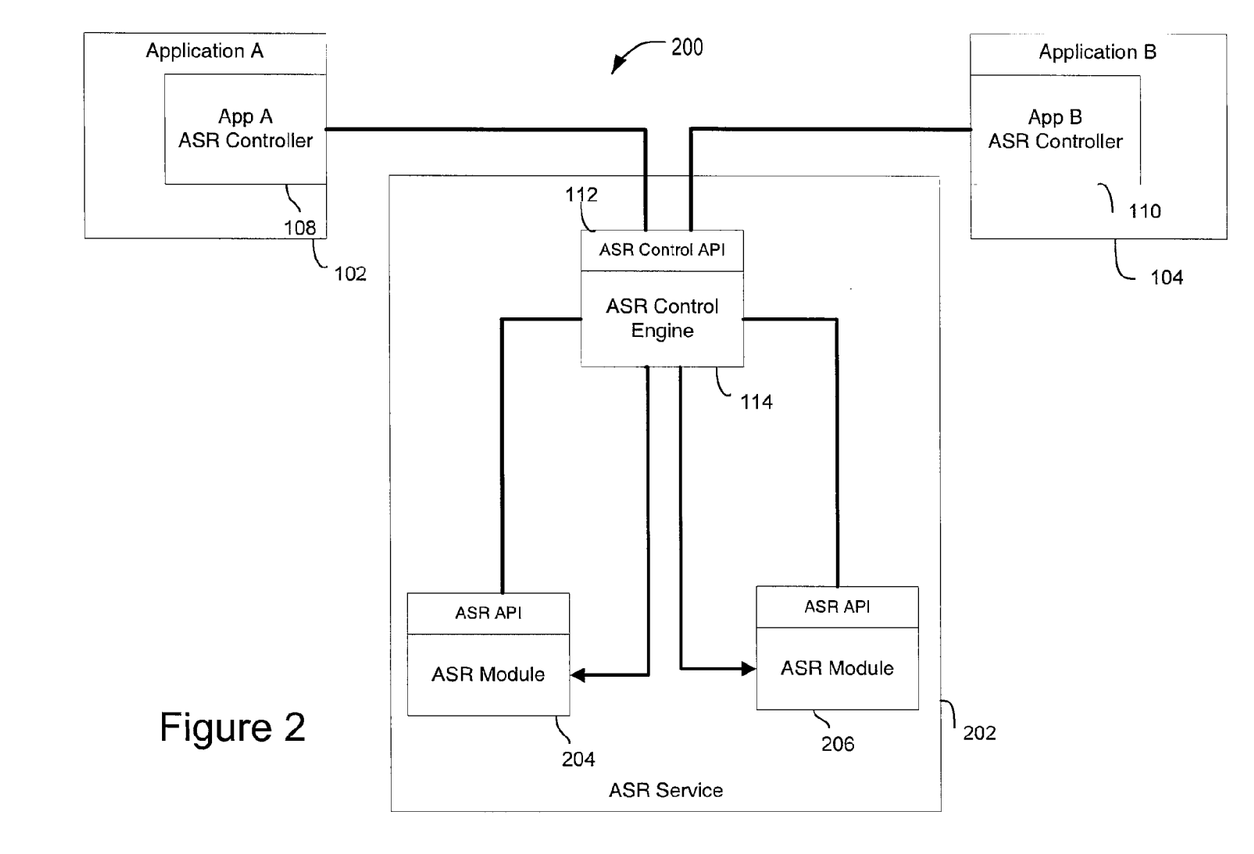
FIG. 2 is a block diagram of an alternative ASR architecture.

In an alternative ASR architecture 200 shown in FIG. 2 the information received from the front-end ASR controller 108 and/or 110 are passed to the ASR control engine 114 that provide application specific controls that manage the multiple ASR modules (two are shown in FIG. 2 (204 and 206), but alternative architectures employ more). In some implementations ASR modules 204 and 206 are similar or identical (both are natural language-based speech engines or grammar-based speech engines) that are run in tandem or simultaneously in which the requested recognition is divided in blocks working on different parts of the same recognition request (e.g., a parallel processing system). In some implementations the ASR modules 204 and 206 operate as a multiprocessing system with one of the ASR modules matching the segments that are probably speech or characteristics representing those segments against a first vocabulary to produce a recognition result and the other performing subsequent and different processing. A subsequent processing may occur when a natural language recognition result is published by ASR module 204 that is then processed by another ASR module 206 against another vocabulary such as a smaller active grammar domain (e.g., a multi-pass operation). In other implementations the ASR service 202 may provide a natural language-based speech engine (ASR module 204) and a grammar-based speech engine (ASR module 206), which allows the ASR service 202 to deliver a grammar-based recognition result when processing some speech segments or characteristics representing them and a natural language-based recognition result when processing other speech segments or characteristics representing them via a single or a predetermined number of recognition sessions with limited data interchanges or exchanges between ASR controllers 108 or 110 and the ASR control API 112 or ASR service 202.

In a variation, multiple ASR modules (such as the two shown in FIG. 2, ASR module 204 and ASR module 206) execute the same or similar recognition on the segments that are probably speech or characteristics representing these segments. Each of the ASR modules (such as ASR module 204 and ASR module 206) may compare the segments that are probably speech or characteristics representing those segments against a different vocabulary to produce a plurality of recognition results. In this variation the ASR control engine 114 may arbitrate between the results and publish one or more of the recognition results through the ASR control API 112. In yet another alternative the ASR control engine 114 may be capable of, but is not required, to perform subsequent processing between the pluralities of the results to generate a composite recognition result by processing the plurality of recognition results.

Figure 3:
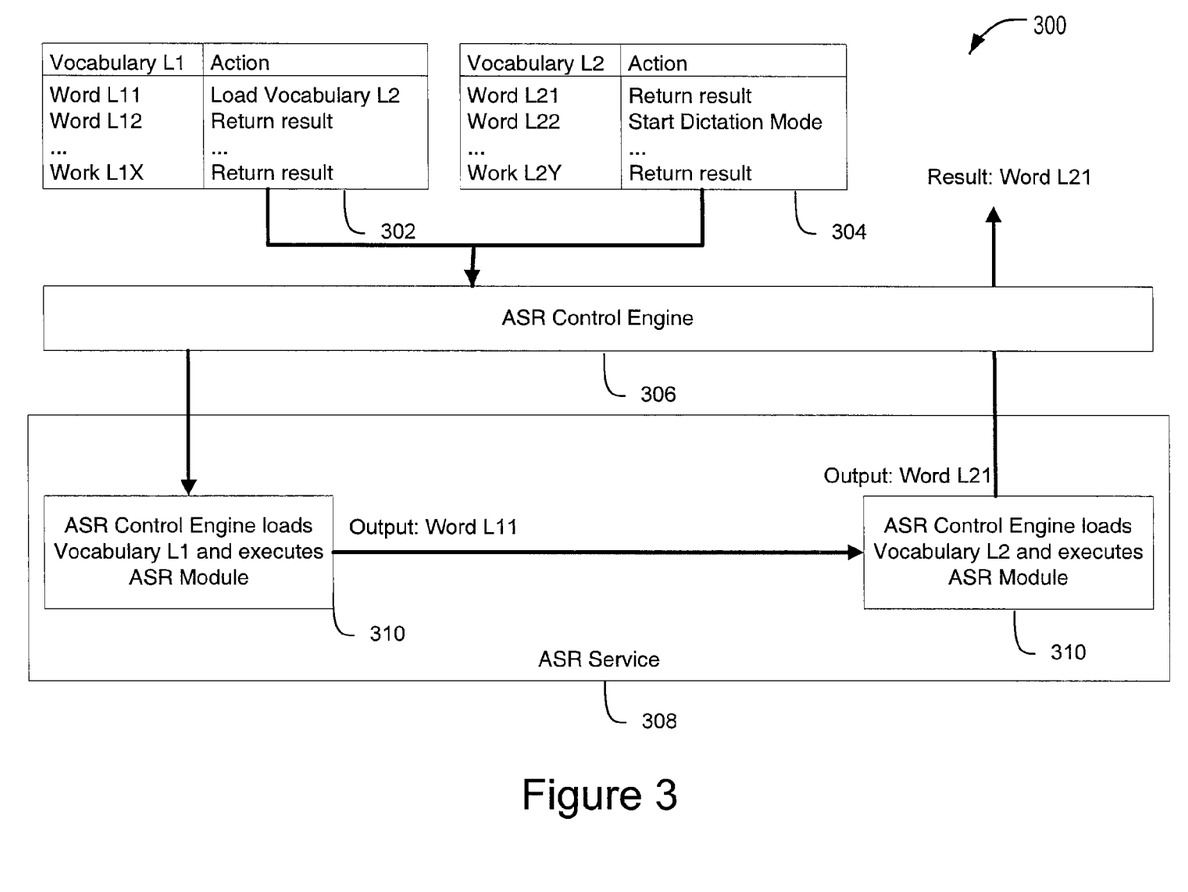
FIG. 3 is a diagram of a multipass ASR process.

FIG. 3 is an overview of an exemplary multi-pass process 300. While shown through an exemplary grammar-based multipass application, other processes process the audio stream segments (or utterances) or characteristics through a grammar-based, natural language-based, or combined process that in some instances may be further processed in response to a request such as an ASR request for example. In FIG. 3, an exemplary ASR control process 300 receives grammars or addresses of the active grammars. In this multipass process multiple grammars may be provided. A first level vocabulary 302 may include the words and phrases to be recognized by a specific application. Another set (e.g., a second set or sublevel vocabulary) of active grammars 304 that are associated with or mapped to the active grammars in the first level vocabulary may be provided separately or through a common or distributed file that the ASR control engine process 306 sends to the ASR service process 308. An active grammar may contain a list of words and phrases to be recognized by the ASR service process 308. The active grammars may contain some programming logic associated with the requesting or receiving application or the programming logic may aid in the comparisons or rendering of the recognition result(s).

In FIG. 3, a receiving ASR control engine process 306 directs an ASR module 310 to compare the audio stream segments to a first level vocabulary 302. Using the local or distributed active grammars identified by the requesting application, the ASR module 310 generates and temporarily stores its recognition results that may occur through a key phrase comparison. The original recognition results may then be compared to a second set or sublevel grammars 304 by the same ASR process 310 that generated the first result or a different ASR module (not shown) in an alternate process. The further processed recognition results are then published or transmitted to the requesting application process or to one or more destinations it may designate.

While each of the systems, engines, methods, and descriptions described may stand alone they also may be encompassed within other systems and applications. Other alternate systems may include any combinations of structure and functions described herein or shown in one or more or each of the figures. These systems or methods are formed from any combination of structure and function described. The structures and functions may process additional or different input. The ASR architectures and processes support synchronous recognition and may deliver grammar-based ASR recognition results, natural language-based ASR recognition results, or a combination in a single (or a few) recognition sessions. One of the benefits of such architecture and processes are that they may recognize speech in real-time with few or no callbacks or limited data interchanges or exchanges between a requesting application and an ASR service. Another benefit allows a third party application to recognize speech or its characteristics automatically within an audio stream segments (or spoken utterances) without directly exposing the hardware and/or software of the ASR service 106 or 202 or 308 to one or more third party applications.

Each of the ASR architectures described also may allow applications to take advantage of an ASR service (106 or 202) by specifying a unique syntax that allows the applications (e.g., 102 or 104) to request sophisticated recognition results without requiring knowledge of the speech platform or ASR service (e.g., 106 or 202). It may include a set of specifications that allows the front-end application (application A 102 and application B 104) to configure itself automatically when the application (102 and/or 104) connects or "plugs" into an ASR service (106 or 202) and "play" (e.g., recognize utterances and/or Intents) without manually configuring the application (102 and/or 104). Some or all of the ASR architectures described may include pre-programmed Intents. These Intents may be programmed by, modified by, or supplemented by one or more front-end applications (102 and/or 104) that may provide, modify, or supplement and Intent directly during its ASR session. For example, if an application (102 and/or 104) is requesting a dictation Intent, the application (102 and/or 104) may send a dictation request, data packets that describe their Intents and requests that may be included, text-to-speech ("tts") prompts or a .WAV file that establishes the prompts, etc. that creates or programs the Intent in the ASR service (e.g., 106 or 202). The application-provided or modified Intents may be executed by the ASR service (106 or 202) during the session without the ASR service maintaining the states or Intents for a subsequent recognition session.

Figure 4:
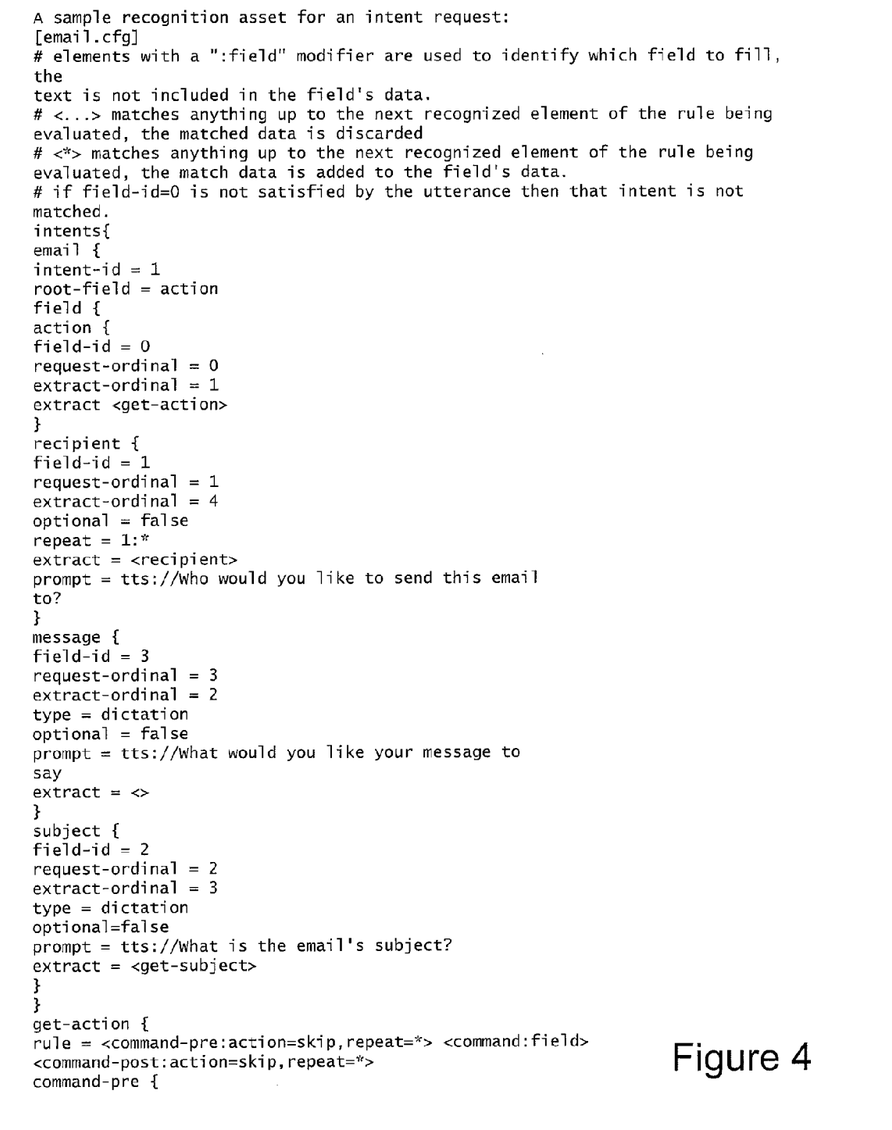
FIGS. 4 and 5 are sample recognition asset for an Intent Request.
Figure 5:
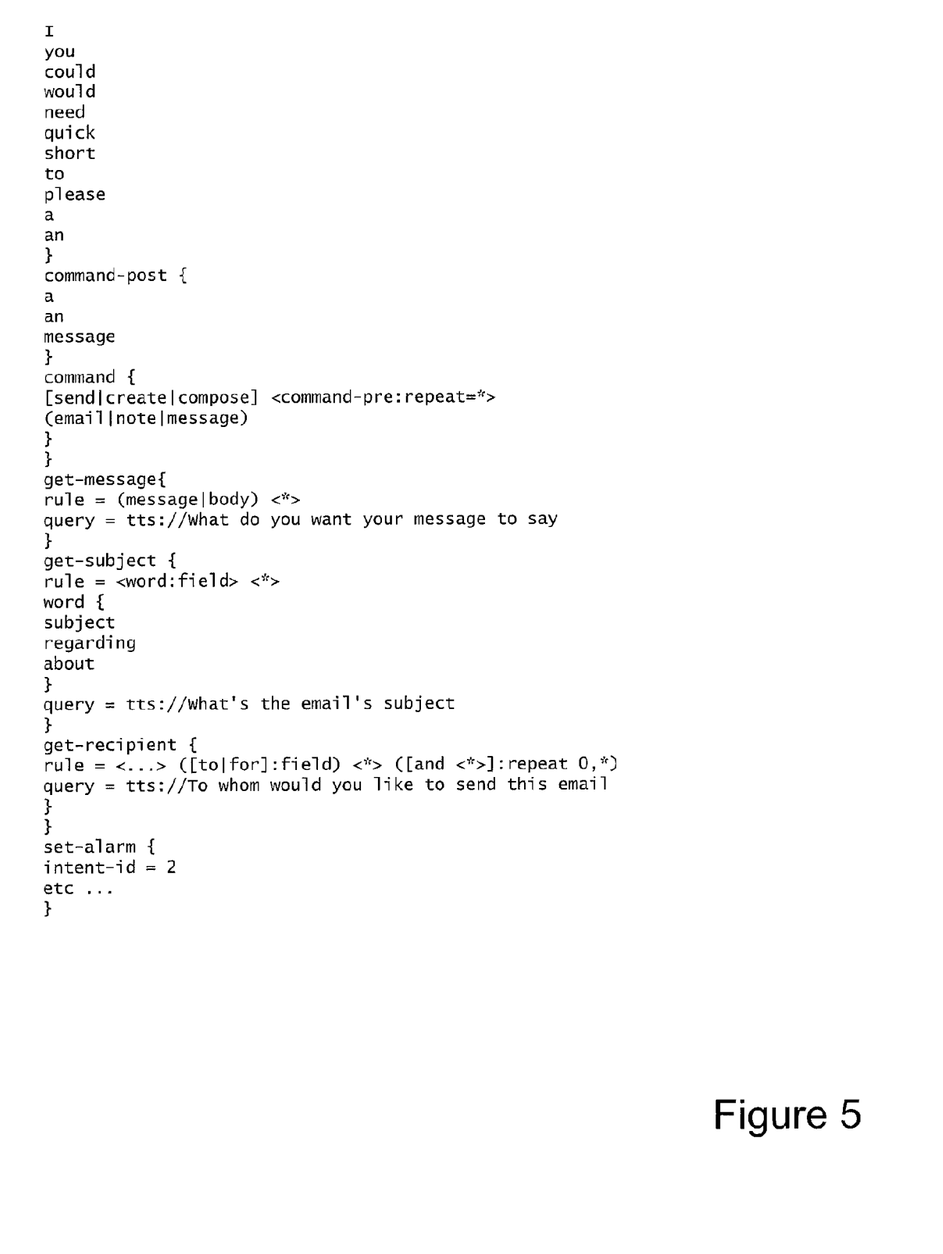

A sample recognition asset for an Intent Request is reflected in the code shown in FIGS. 4 and 5. In FIGS. 4 and 5 the speakers utterance is compared to an email Intent (e.g., one of many Intents the ASR architecture may support) that may comprise one or more fields that may be identified with an ID and include a specified field, request ordinal, extraction ordinal, an optional field, repeat field, prompt field, etc. In FIG. 5, "email" is a root field or the field that identifies this exemplary Intent that is called "action". In the "action" field, the extract ordinal specifies the position of the first extraction and the "extract <get-action>" executes the <get-action> script that follows in FIG. 5.

In the exemplary <get-action> script, the fields that follow indicate an exemplary order that the fields may be identified during the ASR session. The "<command-pre:action=skip, repeat=*>" allows the script to skip words that precede the command. The "command-post" may indicate the data to be skipped, ignored, or deleted. The <get-action> command allows users to send, create, or compose an electronic message, that is segmented by exemplary text-to-speech prompts that asks what the message is going to say, subject or what the email is about, recipient or whom the email will be sent to, etc. As the fields are rendered the ASR service may provide each field with a confidence level or score and when complete a confidence level or score for the Intent that is returned to application A 102 and/or application B 104. Further, some fields may be designated optional by setting the optional field to "true" (in FIGS. 4 and 5 the optional field is designated "false" and thus are considered compulsory or automatic).

Figure 6:
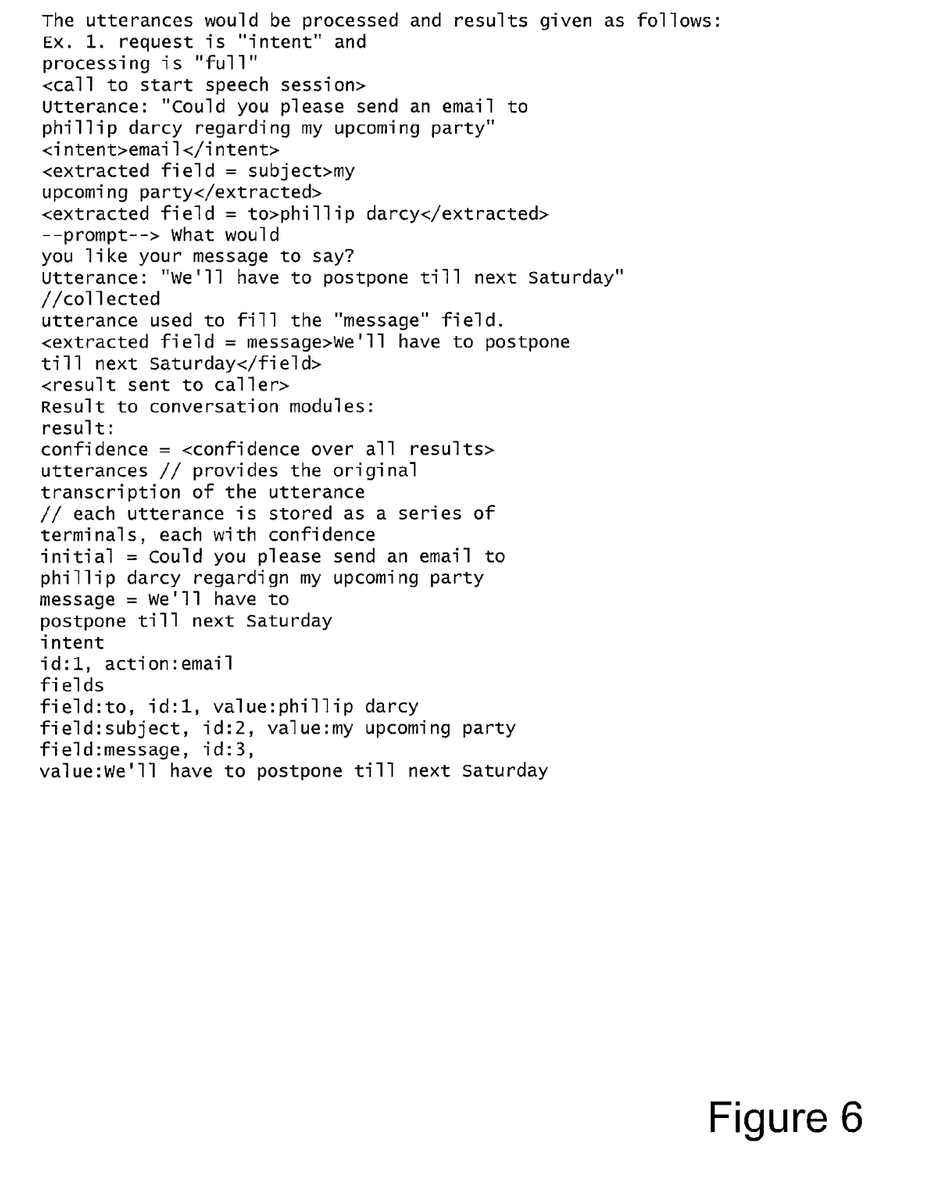
FIGS. 6 and 7 are grammar notations of the utterance processed in FIGS. 4 and 5.
Figure 7:
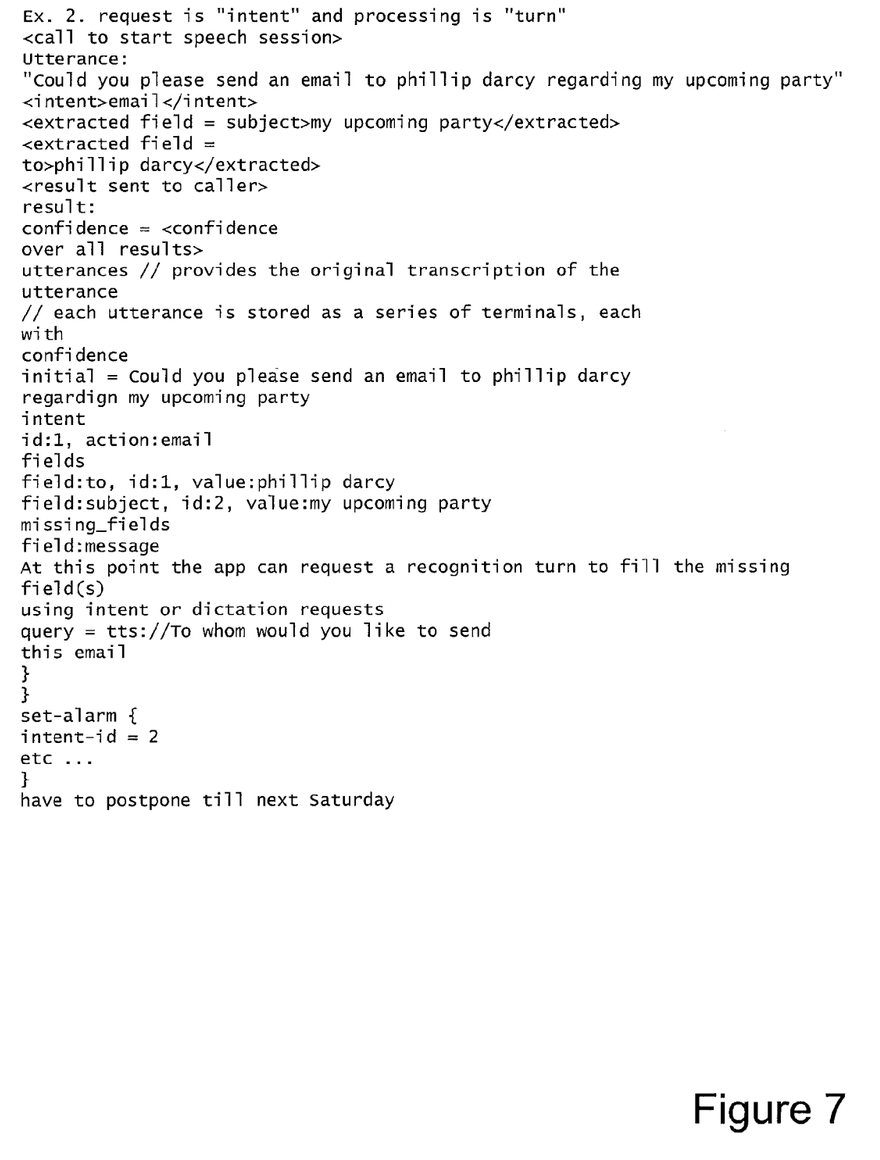

A grammar notation of the utterance processed in FIGS. 4 and 5 is shown in FIGS. 6 and 7. The email Intent is processed in a Full Process that comprises multiple Turns (or Turn Processes) that returns multiple results as shown in FIG. 6 and a Turn Process as shown in FIG. 7. As shown, the email Intent extracted the subject field, which the content is my upcoming party and extracted two fields. In the Full process, the email Intent also prompted the speaker to explain what the message should say. In the Turn Process an application may request the ASR Service to fill in the missing fields using another Intent or by processing a subsequent dictation request made by an application (102 and/or 104). The results of the ASR services (106 and/or 202) are also shown in FIGS. 6 and 7.

The system, engines, methods, and descriptions described may also be programmed in one or more controllers, devices, signal processors, and one or more processors and a coprocessor (e.g., a coprocessor is a processor distinct from a main processor, that performs additional functions to assist the main processor). The processors may be arranged in a parallel processing structure and/or multiprocessing structure. Parallel processing may run on a computer containing two or more processors running simultaneously. Parallel processing differs from multiprocessing in the way a task may be distributed. Alternatively, each of the engines (e.g., grammar-based ASR engines, natural language-based ASR engines, a combination etc.) that are part of the ASR service or ASR service process may run on virtual machines in which one, two, etc. or all are isolated on a complete system platform that supports the execution of a complete operating system (OS). The virtual machines may be limited to the resource and abstractions provided by the particular virtual machine. Some virtual machines may not break out of their isolated virtual worlds to access more resources. In yet another alternative, the ASR service 106 or the ASR control engine 114, ASR control module 118, and/or the other components comprising the ASR service 106 or 202 or 308 may be executed by a multitasking processor executing multiple computer threads (e.g., multithreading).

The applications, ASR service, and processes described may comprise a programmed processor or a portion of a program that executes or supports an ASR system or process. The processor may comprise one, two, or more central processing units that execute the instruction code, mine speech data, and access data from memory that generate, support, and/or complete an operation, compression, or signal modifications. The applications may support and define the functions of a processor that is customized by instruction code (and in some applications may be resident to any ASR enabled systems that may include vehicles, communication systems, medical systems, audio systems, telephones, teleconferencing systems, etc.).

In some applications, the systems, methods, engines, and descriptions may be encoded in a non-transitory signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from ASR enabled devices such as such as cell phones, wireless phones, personal digital assistants, two-way pagers, smartphones, portable computers, vehicle based devices, medical diagnostic systems, medical record systems, and any other devices that interface or include ASR technology. If the descriptions or methods are performed by software, the software or logic may reside in a device where information can be stored and retrieved (e.g., a memory) resident to or interfaced to the one or more processors, devices, or controllers that may support a tangible, audible, tactile, or visual communication interface (e.g., to a display), wireless communication interface, or a wireless system.

The memory may retain an ordered listing of executable instructions for implementing logical functions. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores, communicates, propagates, or transports software or data for use by or in connection with an instruction executable system, apparatus, or device.

The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

What is claimed is:

1. An application services interface system comprising:
a processor;
an automatic speech recognition control application program interface that receives a request for a recognition session from an application-based automatic speech recognition controller;
an automatic speech recognition control engine in communication with the automatic speech recognition control application program interface directs the performance of an automatic speech recognition module; and
the automatic speech recognition module comprises two or more synchronous processing modules delivering a combination of grammar-based ASR recognition results and natural language-based ASR recognition results and compares a spoken utterance to a vocabulary of active grammars to generate recognition results;
where the recognition results are generated by the two or more synchronous processing modules in an ASR session with limited callbacks between the automatic speech recognition control engine and the application-based automatic speech recognition controller.

2. The application services interface system of claim 1 where the recognition results are generated in a single recognition session with no callbacks between the automatic speech recognition control engine and the application-based automatic speech recognition controller by using the two or more synchronous processing modules to deliver the combination of grammar-based ASR recognition results and natural language-based ASR recognition results in the single session.

3. The application services interface system of claim 1 where the recognition results are generated through a limited data interchange between the automatic speech recognition control engine and the application-based automatic speech recognition controller by using the two or more synchronous processing modules.

4. The application services interface system of claim 1 where the recognition results comprise agnostic data.

5. The application services interface system of claim 1 where the automatic speech recognition module comprises a natural language-based speech engine.

6. The application services interface system of claim 5 where the automatic speech recognition module further comprises a grammar-based speech engine.

7. The application services interface system of claim 1 where the automatic speech recognition control engine maintains state by monitoring the details of the state of a speech recognition.

8. The application services interface system of claim 7 where the application-based automatic speech recognition controller is stateless.

9. The application services interface system of claim 1 where the automatic speech recognition module or the automatic speech recognition control engine controls the duration of the ASR session.

10. The application services interface system of claim 1 where the ASR session is subject to a predetermined time constraint.

11. The application services interface system of claim 1 where a speech application program interface includes the application-based automatic speech recognition controller and further includes ASR logic in which a user interacts, and where the automatic speech recognition module includes the ASR logic that recognizes speech.

12. The application services interface system of claim 1 where the automatic speech recognition module resides on a cloud based computing platform.

13. The application services interface system of claim 1 where the automatic speech recognition module recognizes speech by comparing a spoken utterance to a natural language-based vocabulary and a grammar-based vocabulary.

14. The application services interface system of claim 1 where the automatic speech recognition control engine and the automatic speech recognition module each comprise a computing thread executed by a multitasking processor.

15. An application services interface system comprising:
a processor;
an automatic speech recognition control application program interface that receives a request for a recognition session from an application-based automatic speech recognition controller;
an automatic speech recognition control engine in communication with the automatic speech recognition control application program interface directs the performance of an automatic speech recognition module; and
the automatic speech recognition module comprises two or more synchronous processing modules compares a spoken utterance to a vocabulary of active grammars to generate recognition results;
where the recognition results are generated by the two or more synchronous processing modules in an ASR session;
wherein each of the two or more synchronous processing modules of the automatic speech recognition module comprises a plurality of speech engines that are run simultaneously in which content from a request for a recognition result is divided between the plurality of speech engines of each of the synchronous processing modules.

16. An application services interface system comprising:
a processor;
an automatic speech recognition control application program interface that receives a request for a recognition session from an application-based automatic speech recognition controller;
an automatic speech recognition control engine in communication with the automatic speech recognition control application program interface directs the performance of an automatic speech recognition module; and
the automatic speech recognition module comprises two or more synchronous processing modules compares a spoken utterance to a vocabulary of active grammars to generate recognition results;
wherein the two or more synchronous processing modules deliver a combination of grammar-based ASR recognition results and natural language-based ASR recognition results in a single ASR session and without callbacks.

17. An application services interface comprising:
a processor;
an automatic speech recognition control application program interface that receives a request for a recognition session from an application-based automatic speech recognition controller and transmits multi-processed recognition results to an application or a designated address; and
an automatic speech recognition control engine comprising two or more synchronous processing modules in communication with the automatic speech recognition control application program interface that directs the performance of a plurality of speech engines; and
the plurality of speech engines comprise at least one natural language-based speech engine and at least one grammar-based speech engine that compare a spoken utterance to a first vocabulary and then compares a first recognition result to active grammars that comprise a plurality of selected words that are each mapped to one of a plurality of domain specific words to generate the multi-processed recognition results;
where the multi-processed recognition results are generated in synchronism in an ASR session.

18. The application services interface of claim 17 where the multi-processed recognition results are generated using the least one natural language-based speech engine and the at least one grammar-based speech engine in succession.

19. A speech recognition process comprising:
receiving a request for a recognition session from an application-based automatic speech recognition controller that comprises two or more synchronous processing modules that allow for limited callbacks;
comparing a spoken utterance to a first vocabulary to generate a first speech recognition result;
comparing the first speech recognition result to a plurality of selected words that are each mapped to one of a plurality of domain specific words to generate multi-processed recognition results comprising a combination of grammar-based ASR recognition results and natural language-based ASR recognition results; and
transmitting the multi-processed recognition results to the source of the request for the recognition session or to an address;
where the multi-processed recognition results are generated in synchronism in a single ASR session.

20. The speech recognition process of claim 19 where the recognition results are generated by the two or more synchronous processing modules through a single data interchange between an automatic speech recognition control engine and a remote application-based automatic speech recognition controller.

21. The speech recognition process of claim 19 where the where the multi-processed recognition results comprise agnostic data.

22. An application services interface system comprising:
a processor;
an automatic speech recognition control application program interface that receives a request for a recognition session from an application-based automatic speech recognition controller;
an automatic speech recognition control engine in communication with the automatic speech recognition control application program interface directs the performance of an automatic speech recognition module; and
the automatic speech recognition module comprising at least one natural language-based speech engine and at least one grammar-based speech engine generating recognition results in synchronism that compares a spoken utterance to a vocabulary of active grammars to generate recognition results;
where the recognition results are generated in a single ASR session between the automatic speech recognition control engine and the application-based automatic speech recognition controller; and
where the application-based automatic speech recognition controller is automatically configured to the automatic speech recognition control engine when the application-based automatic speech recognition controller connects to the automatic speech recognition control application program interface.

23. The application services interface system of claim 22 where the automatic speech recognition control engine is further configured to recognize a speaker's Intents.

24. The application services interface system of claim 22 where the automatic speech recognition control engine is further configured to receive Intents from the application-based automatic speech recognition controller.

25. The application services interface system of claim 22 where the automatic speech recognition control engine is pre-programmed with Intents.

26. The application services interface system of claim 22 where the application-based automatic speech recognition controller and the automatic speech recognition control engine are compliant with a Plug and Play specification.

* * * * *